United States Patent Office 3,447,929
Patented June 3, 1969

3,447,929
METHOD OF MANUFACTURING A MEAT-CONTAINING EXPANDED FOOD PRODUCT
Douglas Hale, Creve Coeur, Mo., assignor to Ralston Purina Company, St. Louis, Mo., a corporation of Missouri
No Drawing. Filed June 7, 1965, Ser. No. 462,126
Int. Cl. A23k 1/10
U.S. Cl. 99—7                                   4 Claims

ABSTRACT OF THE DISCLOSURE

A method of producing an expanded product directly from proteinaceous material, such as raw meat, that has been heated to decrease the moisture content thereof to a value between 20% and 40% and which has been ground to reduce the particle size thereof. This ground meat material is then subjected to elevated temperature and pressure while being moved through an extruder whereby some of the moisture is converted to steam and the ground and dried meat material is cooked. The material is then expelled through a restricted orifice into a region of lower temperature and pressure, normally atmospheric, whereby the moisture in the material is caused to flash off resulting in an expansion of the material and formation of an expanded product. A farinaceous material component may be combined with the raw meat and extruded to form the expanded product.

---

This invention relates to food manufacture and the products thereof, and with regard to certain more specific features, to the manufacture of proteinaceous and farinaceous foods for general use by humans and animals, but more particularly the latter.

Among the several objects of the invention may be noted the provision of a rapid method for producing puffed proteinaceous or combined proteinaceous and farinaceous foods of improved keeping properties; the provision of a method of the class described which not only gelatinizes the starch of any farinaceous content and cooks or denatures any protein in the proteinaceous content but which avoids biological degradation of the latter, such as has heretofore occurred; the provision of a more sanitary and palatable food product of the class described for use not only for animals but in some cases for human consumption; and the provision of a process of the class described which is economical to perform. Other objects and features will be in part apparent and in part pointed out hereinafter.

The invention accordingly comprises the methods and products hereinafter described, the scope of the invention being indicated in the following claims.

There has existed heretofore a practice in manufacturing certain proteinaceous and farinaceous foods of first cooking by so-called batch-type rendering of proteinaceous material. The rendered material sometimes consisted of by-products of packing plants and the like. Then the rendered product was dried and added to a dry mix of cereals, starches, protein meals, vitamins, minerals, et cetera. Moisture was then replaced and the resultant mixture passed through an extruder, where it was heated to form steam which expanded the mixture to less than its original density upon exit from the extruder. It was difficult to maintain high standards of sanitation in connection with the rendering operations. Moreover, the batch-type rendering steps were also costly. Rendering operations occur under high temperatures over substantial periods and are destructive of the biological value of the flesh used to supply the desired protein. Therefore, by the time the extruding event has been reached, palatability has been impaired. By means of the present invention, a sanitary and palatable dry food having a cooked or denatured proteinaceous component and in some cases a farinaceous component is obtained by an economical process eliminating the precooking or rendering operation. The resulting food also has excellent keeping properties without the requirement for refrigeration.

In the following description, certain examples are given in order to illustrate the principles upon which the invention is based, but it will be understood that use of the invention is not limited to such examples. Extrusions in the examples that follow may be performed for example (but without limitation) in a conventional 4-inch bore extruder with a 36-inch variable-pitch compression screw turning at 125 r.p.m. to produce high compression and elevated temperatures. The screw may be in a straightrified barrel, which is appropriately steam-jacketed for additional heating, for example at 260° F. The discharge of the extruder may be fitted with one or more conventional strainer plates, each with a suitable offset hole or holes, so that the material being extruded is required to follow a tortuous high-friction path. The final die is in the form of a cap with, for example, a single ¼-inch round hole. It will be understood that other configurations of such a hole may be used. It will also be understood that other types of extruders may be employed. An extruder is to be distinguished from simple meat or like grinders, which simply break up flesh or the like by driving material through a die plate but without sufficient compression or friction to cause any substantial heating. In the case of an extruder, on the other hand, material entering the die from the compression screw is subjected to compression and temperature sufficiently high that flesh becomes rapidly cooked in a period of a few seconds. Moisture in material leaving the extruder dies flashes to steam since it is generally superheated. When the material leaving the dies has the compression suddenly relieved, the steam expands and causes puffing of the extruded product, which appears in the form of a thick rope ready to be segmented into pellets or the like.

The degree of compression, heating and the puffing effect can be controlled by the amount of power supplied to the extruder, the dispositions of the die plates, the die cap, and the amount of auxiliary heating supplied by the steam jacket. However, if the extruder material carries too much moisture, it tends to pass through the extruder with insufficient compression to bring about proper steam formation, expansion and puffing. If the moisture content is too low, then the material is susceptible to burning and jamming. Both of these difficulties are avoided by means of the invention.

I have found that my new process functions best when the moisture content of the material passing to and through the extruder is between 20% and 40%. Below 20% the material is susceptible to said burning and jamming. Above 40% said difficulty is encountered in developing enough friction for a given energy input properly to heat the material for gelatinization of the starch content of any farinaceous component or denaturing (cooking) of the proteinaceous component.

EXAMPLE I 100 lbs. of fresh whole mackerel was ground in an ordinary meat grinder through a die plate with ⅛-inch holes. The resulting ground flesh was dried in an oven to a 30% moisture content. The dried ground flesh was then fed into an extruder having the functions above-described. It had a ¼-inch die cap outlet. The feeding rate was 2 lbs. per minute. The material issuing from the outlet die was expanded in the form of a continuous ½-inch rope. The flesh was completely cooked, i.e., denatured. The resulting rope was cut into short pellets and dried at 180° F. for 10 minutes in an open-belt drier. The drying air moved at a velocity of 200 ft. per minute through the open belt.

EXAMPLE II 100 lbs. of raw, boned turkey meat was ground in a meat grinder with ⅛-inch die plate holes. The ground meat was then dried in an oven to a 30% moisture content. The dried ground meat was then fed into the extruder at the rate of 2 lbs. per minute and emerged from its ¼-inch die hole as a ½-inch continuous rope, completely denatured. The rope was cut into 2-inch lengths and placed in a 200° F. oven for 15 minutes to dry to 3% moisture. A tasty snack food was made of this material by spraying it with 8% by weight of coconut oil and 3% salt.

EXAMPLE III 100 lbs. of fresh raw poultry offal such as heads, feet, viscera, etc., was ground in a meat grinder having ⅛-inch holes in its die plate. The ground offal was mixed with the following finely divided farinaceous mixture:

|  | Lbs. |
|---|---|
| Ground whole red wheat | 50 |
| Ground whole corn | 50 |
| Ground oat groats | 50 |
| Soybean meal 50% | 30 |
| Wheat germ | 5 |
| Dried skim milk | 5 |
| Dried yeast | 5 |
| Vitamin and mineral premix | 5 |

The resultant mixture of the offal of comparatively high moisture content with the comparatively dry farinaceous mixture resulted in a moisture content in the mix of 38%. The resulting mix was then fed through an extruder and emerged from its final ¼-inch die opening as a continuous ½-inch rope which, when broken up, resulted in edible nuggets about ½ inch in mean diameter. These were dried in an air stream at 200 ft. per minute at 200° F. for 13 minutes to obtain a final moisture content of 10%. The resultant product was sprayed with 7% lard to form a food which was palatable to dogs and cats.

ALTERNATIVES TO EXAMPLE III

The process of Example III has also been carried out by substituting tripe and melts, or fish heads and scraps, or hamburger, for the poultry offal.

Examples I and II illustrate that a rapidly expanded and cooked meat product is obtained without the use of a separate preliminary batch-rendering or cooking step. It will be observed as to these Examples I and II that meat of comparatively high moisture content is first ground and then reduced under control to a proper moisture content for successful cooking and expansion in and from the extruder. This moisture content, as has been made clear, should be between 20% and 40%. Not until after this drying step does the ground flesh pass through the extruder. Then in so passing, its moisture content in the stated range assures proper compression and heating without burning or jamming for continuous cooking or denaturing of the protein of the flesh. The product is finally dried to reduce any remaining moisture content to a value low enough for long periods of preservation without refrigeration.

Example III illustrates the principle that if a proteinaceous food is desired, the ground-flesh-drying step may be modified by mixing the flesh with the drier farinaceous material. By this means the moisture content of the mix for the extruder is brought into the range of 20% to 40%. This mix, in passing through the extruder, again will develop enough frictional energy to properly heat for gelatinization of the starch in the farinaceous material and denaturing of protein in the proteinaceous material, without burning or jamming.

Although air-drying has been mentioned as a suitable drying process, it may be understood that vacuum-drying may be employed.

In all cases, cooking of the flesh occurs very rapidly in the extruder. Hence minimum biological damage is done to the proteins, with consequent preservation of better flavor. Moreover, in the case of drying of the material for passage through the extruder by admixture of comminuted grains, etc., the rapid heating in the extruder gelatinizes the starch content of the farinaceous material, besides quick cooking of the proteinaceous material. Also, in all cases the rapid heating to a cooking and gelatinizing temperature in the extruder can more readily be carried out under sanitary conditions than is possible in the case of the old batch-type rendering processes employed for cooking the flesh.

In view of the above, it will be seen that the invention results in a low-cost process for producing cooked proteinaceous foods or foods consisting of proteinaceous and farinaceous mixtures, all of which have improved palatability and are much more sanitary.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. The process of manufacturing an expanded food product from a proteinaceous meat material consisting essentially of grinding raw meat material, drying the ground raw meat to a moisture content in the range of from 20% to 40%, simultaneously applying elevated pressure and heating said ground and dried meat material to a temperature to convert some of the moisture to steam and for a sufficient period of time to cook the ground and dried meat material, and then extruding the heated, pressurized meat material through restricted orifice means into an environment of lower pressure, causing expansion of the cooked meat material and formation of an expanded food product.

2. The process according to claim 1 including breaking up the expanded cooked meat material into pellets and further drying the pellets.

3. The process of manufacturing an expanded food product from a proteinaceous meat material and a gelatinized farinaceous material, consisting essentially of forming a mixture of ground raw meat and granular farinaceous material, the mixture having a moisture content in the range of from 20% to 40%, simultaneously applying elevated pressure and heating said mixture to a temperature to convert some of the moisture to steam for rapidly cooking the raw meat and gelatinizing the farinaceous material, and then extruding the heated, pressurized mixture through restricted orifice means into an environment of lower pressure, causing expansion of the cooked meat and gelatinized farinaceous material to form an expanded food product.

4. The process according to claim 3 including breaking up the expanded cooked meat material into pellets and further drying the pellets.

References Cited

UNITED STATES PATENTS

| 1,924,826 | 8/1933 | Anderson | 99—2 |
| 2,835,583 | 5/1958 | Higgins et al. | 99—2 |
| 3,230,902 | 1/1966 | Grimm et al. | 99—2 X |
| 3,346,394 | 10/1967 | Rongey et al. | 99—109 |

FOREIGN PATENTS 680,873   2/1964   Canada.

LIONEL M. SHAPIRO, *Primary Examiner.*
D. M. NAFF, *Assistant Examiner.*

U.S. Cl. X.R.

99—2, 14, 18, 108, 109